(No Model.) 2 Sheets—Sheet 1.
B. CLOUTIER.
COCKLE SEPARATOR.
No. 334,643. Patented Jan. 19, 1886.
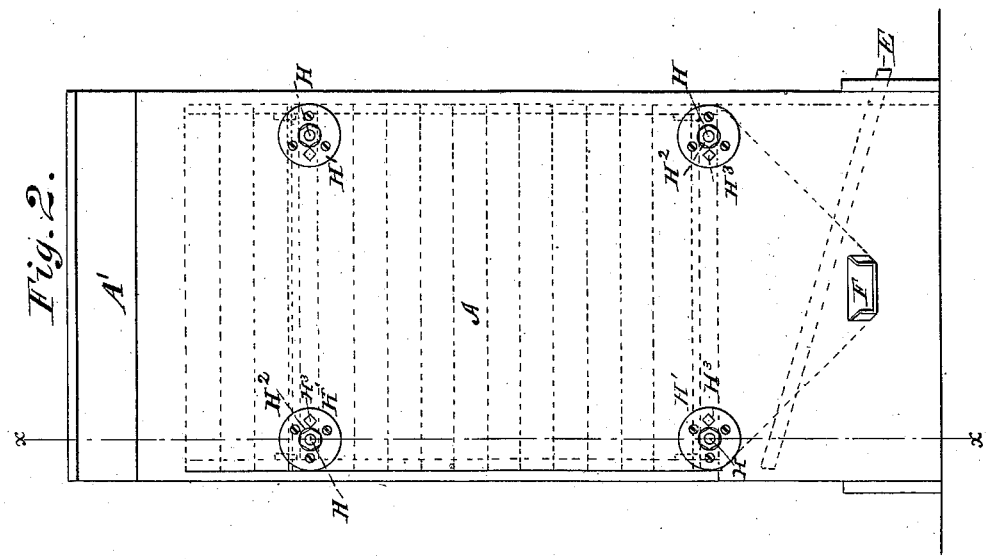
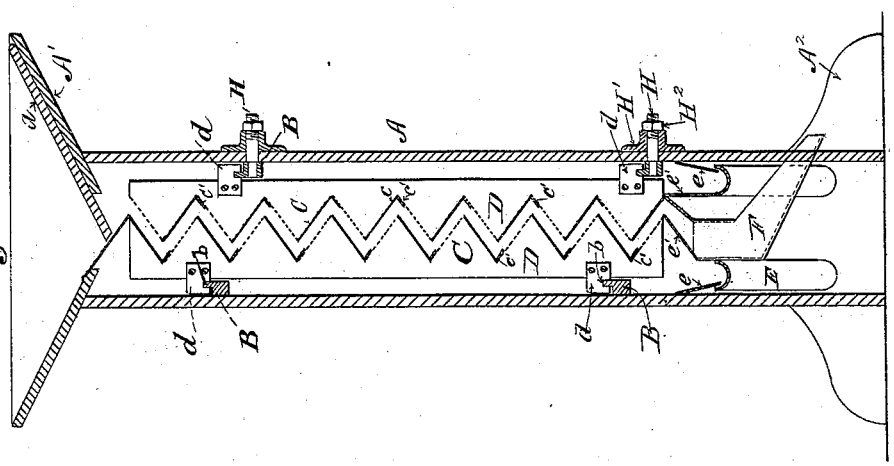
Witnesses
R. H. Sanford.
Geo. McNeil
Inventor
Bernard Cloutier
By Amasa C. Paul
Atty.

(No Model.) 2 Sheets—Sheet 2.

B. CLOUTIER.
COCKLE SEPARATOR.

No. 334,643. Patented Jan. 19, 1886.

Witnesses
R. H. Sanford.
Geo. McNeil.

Inventor
Bernard Cloutier,
By Amasa Paul
Atty.

UNITED STATES PATENT OFFICE.

BERNARD CLOUTIER, OF MINNEAPOLIS, MINNESOTA.

COCKLE-SEPARATOR.

SPECIFICATION forming part of Letters Patent No. 334,643, dated January 19, 1886.

Application filed August 18, 1885. Serial No. 174,700. (No model.)

*To all whom it may concern:*

Be it known that I, BERNARD CLOUTIER, a citizen of the United States, and a resident of Minneapolis, in the county of Hennepin and State of Minnesota, have invented certain Improvements in Cockle-Separators, of which the following is a specification.

My invention relates to improvements in cockle-separators in which the grain is passed between zigzag screens by which it is freed from the cockle and other seeds that may be mixed with it; and my invention consists, generally, in the construction and combination of devices hereinafter described, and particularly pointed out in the claims.

Figure 3:
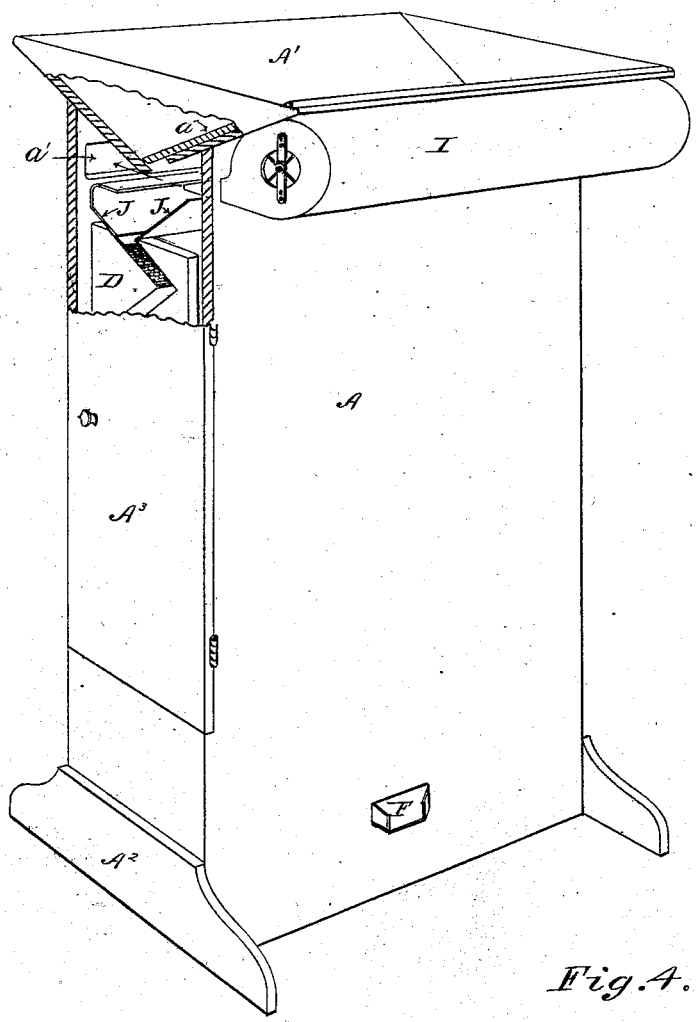
Figure 4:
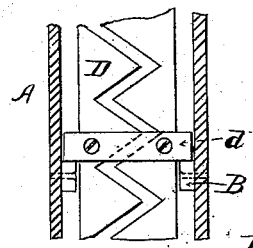

In the accompanying drawings, forming part of this specification, Figure 1 is a vertical section of the mill on line $x\ x$ of Fig. 2. Fig. 2 is a side elevation. Fig. 3 is a perspective. Fig. 4 is a detail.

In the drawings, A represents the main frame or casing of the machine. This casing is preferably of the rectangular shape shown in the drawings, and it is provided with a suitable hopper, A', having a slide, $a$, by which the feed may be regulated, and suitable bases or feet, $A^2$, by which the casing is supported in an upright position. The casing is also provided at one of its vertical ends with a door, $A^3$, hinged or otherwise suitably secured to the main part of the casing. Extending horizontally within the casing are suitable supporting-rails, B. Two or more, but preferably two, of these rails are secured to each side of the casing, one being arranged near the top part thereof and the other near the bottom.

C C represent zigzag screens, each secured opposite to the other in a supporting-frame, D, that is removably secured to the rails B, within the casing A. The frames D are provided with projecting ears or lugs $d$, which are adapted to rest on the rails B and to slide thereon, so that when it is desired to insert the screens the door $A^3$ is opened and the frames are placed in the opening with the lugs resting on the rails and are slid into the casing to the position shown in Fig. 1. The door is then closed, thereby closing the space between the screens at the side of the frames. The screens are located in the casing at a point sufficiently above its base to permit the arrangement in the lower part of the casing of spouts or conductors for carrying out the cockle and discharging the grain. An inclined spout, E, is located in the base of the casing beneath the space back of each screen, and discharges preferably through the end of the base opposite the door $A^3$. Suitable deflectors, $e\ e'$, are arranged above the spouts E to direct the falling cockle into the spouts E. I also prefer to provide a conductor, F, for the grain, locating it beneath the space between the screens and extending through the side of the base near the center, as shown in Fig. 2. The upper inclined surface of each of the angular portions of the zigzag screens is traversed by the grain passing through the machine, and through these screening surfaces the cockle and other small seeds pass while the grain continues down the space between the screens. The lower inclined part of the angular portions of the screens is made imperforate, so that the cockle cannot pass back into the space between the screens after it has been removed by the screens. The screens are preferably formed of wire-cloth with a suitable back board, $c$, over the lower part of the angles. It may, however, be formed with a series of perforate portions for the upper surfaces of the angles and of suitable imperforate material for the lower surfaces. Small strips of sheet metal $c'$ are secured preferably to the front of each screen, as shown, to receive the impact of the falling grain. I prefer to form the rails B with upwardly-projecting lips $b$, as shown, and to form the lugs on the frames with suitable recesses fitting over said lips. By this means each frame is securely held to its supporting-rails. In some instances it is desirable to adjust one of the screens to increase or decrease the space between the screens. I have shown in Fig. 1 one means by which this may be done. In this construction the upper and lower rails are secured to bolts H, which pass through washers H', secured to the side of the casing. These bolts are provided with nuts $H^2$, outside of the washers. Set-screws $H^3$ pass through the washers and bear against the rails. By loosening nuts $H^2$ and turning in the set-screws, the rails may be moved in carrying the supported screen toward the opposite screen and diminishing the space between them. By reversing the operation the screens may be separated. It will be seen that when the door is opened the space between the screens is exposed, and should any straw or other obstruction get between the screens it may be removed by a suitable instrument without removing the screens. The screens may also be examined, and it may be seen whether they are in proper adjustment.

In Fig. 3 I have shown the separator with a fan-blower arranged below the hopper to remove any chaff or straw there may be in the grain, so that it will not pass into the narrow space between the screens and form an obstruction to the passage of the grain. The blower-casing I is located just beneath one side of the hopper, and its shoe opens into the casing just below the hopper-opening and above the upper end of the passage between the screens. An opening, $a'$, is provided through the opposite side of the casing, through which the straw and chaff are blown out. Suitable deflectors, J, are provided beneath the hopper to direct the grain into the space between the screens. The fan may be operated by any suitable means, as a treadle or a crank. The grain passes in a thin sheet from the hopper, and falls into the space between the screens. The blast from the fan blows any chaff or straw out through the opening $a'$ in the side of the casing.

The form and location of the horizontal rails upon which the frames carrying the screens slide may be changed, and in Fig. 4 I have shown a detail view with rails formed of narrow strips secured to the walls of the casing, and with the lugs $d$, formed by a strip of wood or other material, secured to both screen-frames and extending from one rail to the other.

The frames D may, as an equivalent construction, be provided with notches or recesses adapted to engage with the supporting-rails, and these rails may be located above and below the ends of the frames. A single rail upon each side of the casing may be found sufficient to support and guide the frames.

Other suitable conductors may be used in place of the inclined spouts for conducting the cockle and small seeds out of the casing.

I claim as my invention—

1. The combination, with the vertical casing A, provided with horizontal rails B, of the vertical frames D, provided with the opposing zigzag screens C, and having lugs $d$, adapted to slide on the rails B, as and for the purpose set forth.

2. The combination, with the vertical casing A, having hopper A', the door $A^3$ in its vertical end, and the horizontal rails B, of the vertical frames D, carrying the opposing zigzag screens C, and having the lugs $d\ d$, adapted to rest and slide on the rails B, substantially as described, and for the purpose set forth.

3. The combination, with the vertical casing provided with the guide-rails B, of the vertical frames D, supported upon and adapted to slide on said rails, and provided with the opposing zigzag screens C, and separate conductors for conducting the grain and small seeds from the casing, all substantially as and for the purpose set forth.

4. The combination, with the vertical casing A, horizontal rails B, and means for adjusting said rails, of the vertical frames D, carrying the opposing zigzag screens C, and having the lugs $d$, adapted to slide on said rails B, all substantially as described.

5. The combination, with the vertical casing having a door in its vertical end and horizontal supporting-rails located within said casing, of the vertical frames D, supported upon and free to slide on said rails and carrying the opposing zigzag screens C, all substantially as described, and for the purpose set forth.

In testimony whereof I have hereunto set my hand this 15th day of August, 1885.

BERNARD CLOUTIER.

In presence of—
A. C. PAUL,
THOS. S. McNEIR.